US006915884B1

(12) United States Patent
Glazier

(10) Patent No.: US 6,915,884 B1
(45) Date of Patent: Jul. 12, 2005

(54) LOAD SENSING SYSTEM

(75) Inventor: Mark Glazier, Hampshire (GB)

(73) Assignee: Glide-Rite Products Limited, Hampshire (GB)

( * ) Notice: Subject to any disclaimer, the term of this patent is extended or adjusted under 35 U.S.C. 154(b) by 0 days.

(21) Appl. No.: 09/889,234

(22) PCT Filed: Jan. 14, 2000

(86) PCT No.: PCT/GB00/00089

§ 371 (c)(1),
(2), (4) Date: Nov. 29, 2001

(87) PCT Pub. No.: WO00/41922

PCT Pub. Date: Jul. 20, 2000

(30) Foreign Application Priority Data

Jan. 15, 1999 (GB) .................................. 9900968

(51) Int. Cl.[7] .............................. B60T 8/18; B60G 9/04
(52) U.S. Cl. ........... 188/195; 267/DIG. 1; 280/124.159
(58) Field of Search ............................. 303/22.1, 22.2, 303/22.3, 22.7, 22.8; 188/190, 195; 280/124.157, 280/124.158, 124.159, 124.16; 267/DIG. 1, 267/DIG. 2, 64.16, 64.17

(56) References Cited

U.S. PATENT DOCUMENTS

| 3,162,491 A | | 12/1964 | Van Winsen | |
|---|---|---|---|---|
| 4,235,478 A | | 11/1980 | Billeter | |
| 4,826,259 A | * | 5/1989 | Biegel | ....................... 303/22.2 |
| 4,923,253 A | * | 5/1990 | Pollner et al. | ................. 303/7 |
| 4,925,251 A | * | 5/1990 | Picot et al. | ................ 303/22.1 |
| 5,039,174 A | * | 8/1991 | Beacon et al. | ............. 303/22.7 |
| 5,052,761 A | * | 10/1991 | Thony | ....................... 303/22.6 |
| 5,201,572 A | * | 4/1993 | Castel | ....................... 303/22.5 |
| 5,211,450 A | * | 5/1993 | Gayfer et al. | .............. 303/22.2 |
| 5,303,986 A | * | 4/1994 | VanDeMotter et al. | ........ 303/3 |
| 5,346,246 A | * | 9/1994 | Lander et al. | ........ 280/124.157 |
| 5,486,039 A | * | 1/1996 | Petiot | ....................... 303/22.6 |
| 5,615,931 A | * | 4/1997 | Stumpe et al. | ............ 303/22.1 |
| 5,735,580 A | * | 4/1998 | Klink | ....................... 303/22.6 |

FOREIGN PATENT DOCUMENTS

| CH | 628117 A5 | * | 2/1982 |
|---|---|---|---|
| GB | 836100 | | 6/1960 |
| GB | 936324 | | 9/1963 |
| GB | 1 519 159 | | 7/1978 |
| JP | 59059552 | | 4/1984 |
| JP | 60082471 | | 5/1985 |
| WO | WO93/19959 | | 10/1993 |

* cited by examiner

Primary Examiner—Matthew C. Graham
Assistant Examiner—Melody M. Burch
(74) Attorney, Agent, or Firm—Finnegan, Henderson, Farabow, Garrett & Dunner, L.L.P.

(57) ABSTRACT

A braking system for a vehicle with air suspension, where a brake sensor amplification factor increases in proportion to an increase in gross vehicle weight is provided. The braking performance may vary within a predetermined range. Further, a load sensing arrangement for the braking system may include a pressure sensor for detecting an air pressure in an air suspension, a variable throttling valve for controlling the flow of brake fluid to a brake actuator, and a control means to vary the throttling effect of the throttling valve based on an output of the pressure sensor.

7 Claims, 6 Drawing Sheets

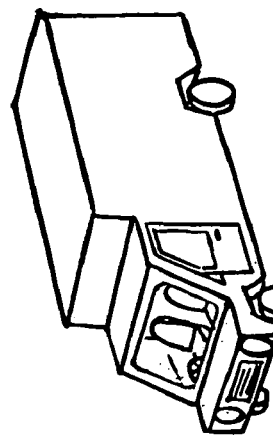
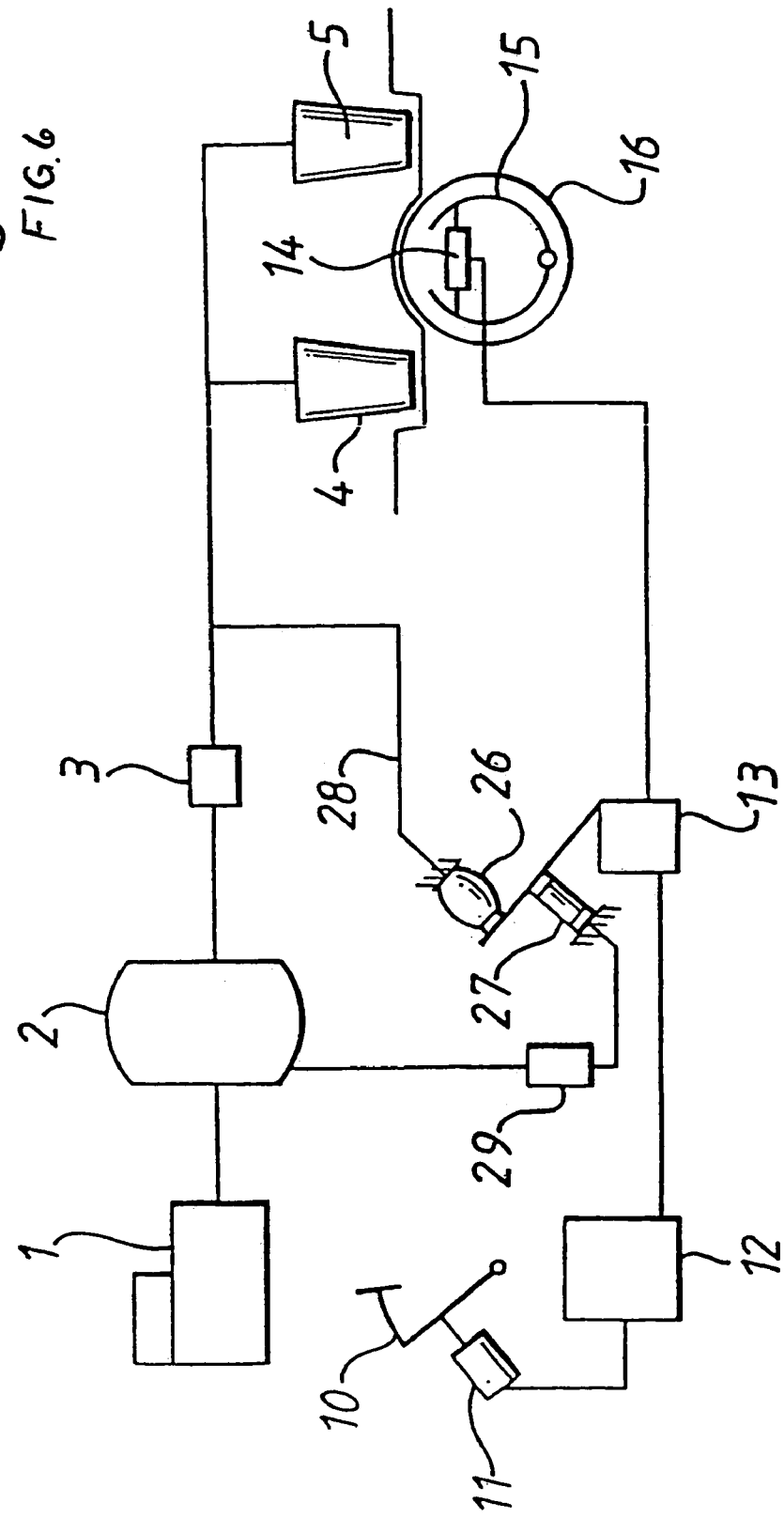

LOAD SENSING SYSTEM

FIELD OF THE INVENTION

The present invention relates to braking systems for vehicles, and is particularly concerned with braking systems for passenger or load-carrying vehicles, most particularly light commercial vehicles.

BACKGROUND OF THE INVENTION

Commercial vehicles have for many years been fitted with servo braking systems which apply brake fluid, which may be a hydraulic fluid or air, to brake actuator cylinders in response to control inputs from the vehicle driver. Pressure of the driver's foot on a brake pedal controls the flow of brake fluid to operate the brake actuator cylinders and apply brake shoes or pads to the vehicle wheel hubs or brake discs, respectively. The fluid is provided to the actuator cylinder from a high-pressure source via a servo device. By this means, the force applied by the driver to the pedal is amplified to the levels necessary to arrest the movement of a heavy vehicle.

In commercial vehicles, it is desirable for the vehicle to be able to carry a large payload in proportion to the unladen weight of the vehicle, and thus there is great variation between the unladen and fully laden weights of such vehicles. When the vehicle is unladen, deceleration can be achieved satisfactorily with relatively low fluid pressures in the brake actuator cylinders. As the total weight of the vehicle increases, braking requires higher fluid pressures in the brake actuator cylinders in order to produce the same deceleration rate. It is also necessary to provide a braking system which provides predictability to the driver, by giving the same or similar deceleration rates for similar pedal pressures at any loading state of the vehicle. This is achieved by providing a braking system which, for the same pedal pressure applied by the driver, applies less fluid pressure to the brake actuator cylinders when the vehicle is unladen than when it is heavily loaded.

To effect such a control of the vehicle braking system, it is conventional to provide a throttling valve, known as the "load sensing valve" in the fluid circuit supplying the brake actuator cylinders. The load sensing valve comprises a valve body and an operating arm, the valve body having a passage provided with a variable throttling element whose throttling effect is varied by moving the operating arm. The valve body is conventionally fixed relative to the vehicle body and the operating arm is attached to an axle of the vehicle on spring-suspended vehicles. This arrangement may however be reversed. As more load is placed on the vehicle, the suspension springs are compressed, and the distance between the points to which the load sensing valve is attached varies as the axle moves nearer to the vehicle body. The compression of the suspension springs progressively reduces the "ride height" of the vehicle as it is more heavily loaded, and acts as an indicator of the weight of the vehicle. An individual correlation will therefore exist between the loading state and the ride height of the vehicle, depending on the characteristics of the suspension springs. The driver of the vehicle will become accustomed to the braking performance of the vehicle at various loading states.

The operation of the load sensing valve is to provide a strong throttling action to reduce the flow of brake fluid to the brake actuator cylinders when the vehicle is lightly loaded, and when the vehicle is heavily loaded to provide little or no throttling action and allow brake fluid to flow unimpeded to the brake actuator cylinders when the driver applies pedal pressure. The actual braking effect generated by the brake actuator cylinders thus increases as the vehicle is more heavily loaded. Each vehicle has a design relationship between the gross weight and the braking amplification factor, calling for a predetermined variation of the degree of throttling provided by the load sensing valve over the range of vehicle weight from unladen to maximum gross weight. Typically, the load sensing valve will reduce the brake fluid pressure by some 1500 psi when the vehicle is unladen, and will allow free flow when the vehicle is at its maximum gross weight.

In recent years the use of "air suspension" has become widespread in heavy goods vehicles. However, in applying this technology to light goods and passenger vehicles, vans or the like a significant difficulty has emerged as regards the variation of braking performance with vehicle weight.

In vehicles using air suspension, the vehicle is supported on its axles not by springs but by suspension units or "bags" filled with air under pressure. The "bags" may be flexible structures of toroidal or other form, or may be telescoping structures having sliding or rolling diaphragm seals. The "ride height" of the vehicle is controlled by varying the pressure within the bags, and thus is no longer dictated by the gross vehicle weight. The bags may also be inflated or deflated to raise or lower the vehicle body in relation to the ground, this feature being of great assistance in loading the vehicle, since by lowering the vehicle body the height to which cargo need be lifted to enter the vehicle's loadspace is reduced.

It has been found that the handling and "driveability" of the vehicle is improved by adopting a control system for the bag pressure which adjusts the ride height to a maintain it at a constant level slightly below the unladen position. Such a control provides for a predetermined amount of suspension travel at all loading states, to maintain the ground clearance of the vehicle at a required distance. Ride height control may be achieved by admitting air into or venting air from the bags in response to a measurement of ride height. Maintaining a constant ride height however means that the ride height cannot be used as an indicator of the vehicle's gross weight in a control arrangement for the braking system.

SUMMARY OF THE INVENTION

An objective of the present invention is to provide a braking system for a vehicle with air suspension, wherein the brake servo amplification factor increases in proportion to an increase of the gross vehicle weight. Another objective of the invention is to provide a braking system for a vehicle with air suspension, wherein the braking performance varies as a function of the gross vehicle weight throughout a predetermined weight range.

A further objective is to provide a load sensing arrangement for a vehicle with air suspension, operable to control the braking system of the vehicle in accordance with the gross vehicle weight.

A yet further objective of the invention is to provide a combined air suspension and braking system for a vehicle, whereby a substantially constant ride height may be maintained and the braking effect varied in accordance with the gross vehicle weight.

In accordance with a first aspect of the invention, there is provided a vehicle having a body suspended on one or more axles by means of gas-filled bags, the vehicle being provided with means to vary the pressure within the bags to control the spacing between the body and the axle or axles and a braking system supplying a brake fluid to braking actuators operable to brake the vehicle's wheels, and further comprising a load sensing valve operable to apply a variable throttling effect to impede the flow of brake fluid to the braking actuators, characterised in that the throttling effect of the load sensing valve is varied by a control means responsive to the pressure within the gas-filled bags.

A second aspect of the present invention provides a load sensing arrangement for a braking system of a vehicle with air suspension, the load sensing arrangement comprising a sensor for detecting the air pressure in the air suspension, a variable throttling valve operable to control the flow of brake fluid to a brake actuator, and control means to vary the throttling effect of the throttling valve in dependence on the output of the pressure sensor.

In an advantageous embodiment of the load sensing arrangement, the variable throttling valve comprises a valve element movable between closed and open positions to vary the throttling effect, and a fluid pressure actuator responsive to the pressure in the air suspension and operable to urge the valve element toward its open position against a restoring force. The restoring force may be provided by a second fluid pressure actuator, or by a resilient element such as a spring. The second fluid pressure actuator may be supplied with fluid at a reference pressure. Alternatively, the second fluid pressure actuator may be supplied with fluid at one of a number of pressures selected on the basis of the vehicle load.

In an alternative embodiment of the load sensing arrangement, the pressure in the air suspension is sensed by an electrical or electromechanical sensor to provide an electrical output signal corresponding to the suspension pressure, and the variable throttling valve is electrically controllable to vary the flow of brake fluid to a brake actuator, and a control circuit varies the throttling effect of the throttling valve in dependence on the output signal from the pressure sensor. It is further foreseen that the suspension and braking systems may be interlinked by an electrical or electronic control means, by providing sensors giving electrical output signals relating to ride height to control the supply of air to the suspension units, a detector to give an electrical output corresponding to suspension unit pressure, and an electrically controllable throttling valve to vary the flow of brake fluid to a brake actuator, the control means providing control signals to the throttling valve in dependence on the sensed suspension unit pressure.

BRIEF DESCRIPTION OF THE DRAWINGS

Embodiments of the invention will now be described in detail with reference to the accompanying drawings, in which:

FIG. 1 shows a schematic view of an air suspension system and associated braking system according to a first embodiment;

FIG. 6 provides a diagrammatic representation of a vehicle including a load sensing system according to an exemplary embodiment of the present invention.

DESCRIPTION OF THE INVENTION

Figure 2A:
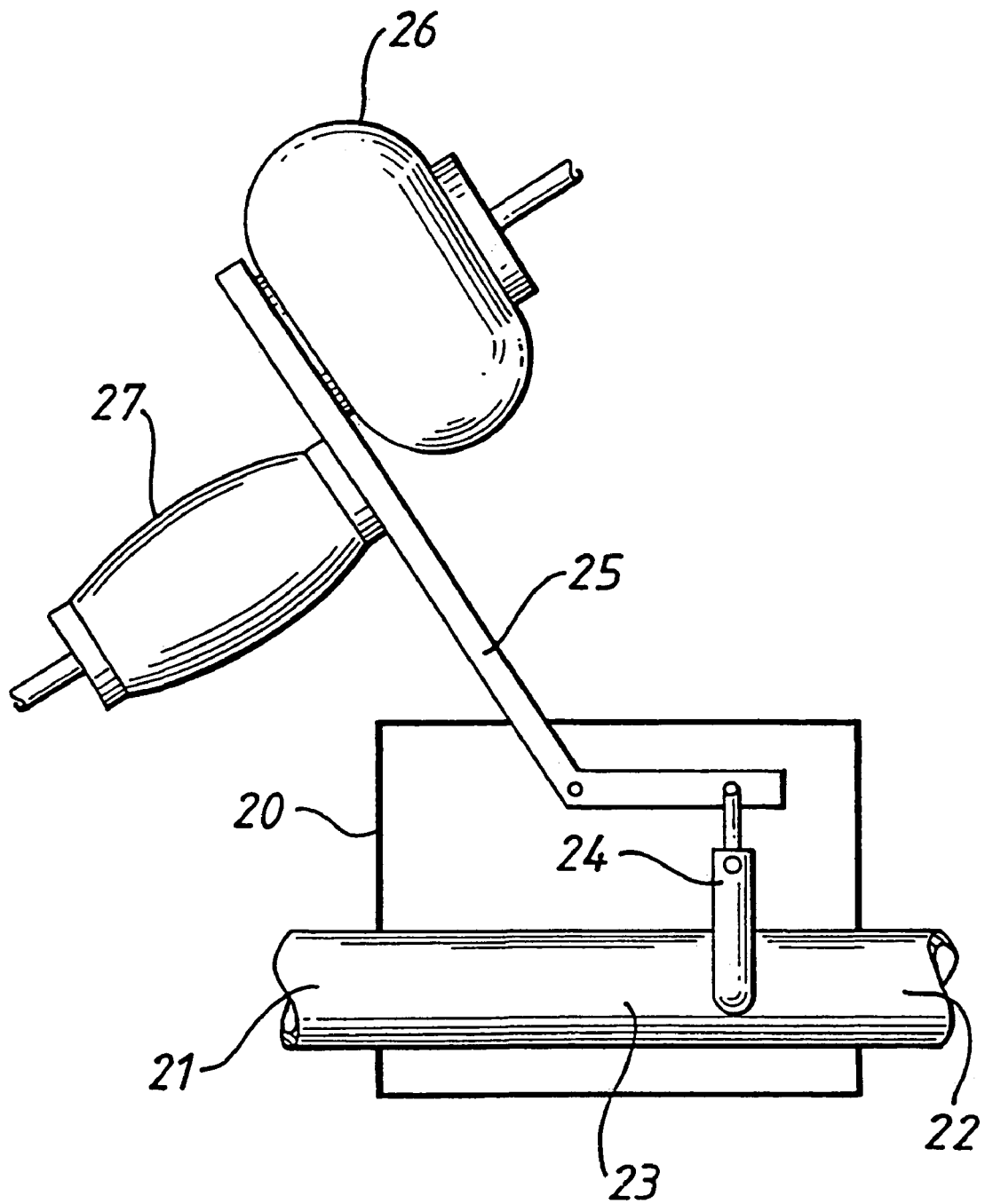
FIGS. 2A and 2B are a schematic views of the load sensing valve of the suspension and braking system of FIG. 1 when the vehicle is lightly loaded and heavily loaded, respectively.

Referring to FIG. 1, there is shown an air suspension system for a vehicle as shown in FIG. 6, comprising an air compressor 1, an air reservoir 2, a ride height sensor 3 and a pair of air bags 4. The air bags 4 are positioned between the vehicle body (not shown) and the vehicle axle, to support the body.

The ride height sensor 3 is a valve which in one control position can admit air from the reservoir 2 to the air bags 4, and in a second control position seals the air bags from the reservoir, and in a third control position can allow air to escape from the air bags 4 to atmosphere. The ride height sensor 3 is conventionally mounted to the vehicle body, and has a control element linked to an axle. As the axle is moved relative to the vehicle body, the control element of the ride height sensor moves to place the ride height valve in one of the three control positions. The arrangement is such that when the vehicle body is in the datum position relative to the axle, the ride height sensor is in its second position and air is neither admitted to nor vented from the air bags 4. The datum position of the body is set to be slightly below the body height at maximum suspension extension, to provide for the maximum usable suspension travel during operation of the vehicle while enabling the suspension to lift the vehicle body slightly above datum height during a transition from a loaded to an unloaded state.

When an increase in load compresses the air bags 4, and lowers the vehicle body from its datum position, the ride height sensor is moved to its first control position and air is admitted to the air bags to reinflate them until the datum height is regained.

With a decrease in load, the air bags 4 expand and lift the vehicle body slightly above its datum position. The ride height sensor is then moved to its third control position and air is vented from the air bags to deflate them until the vehicle body returns to datum height.

The vehicle braking system comprises a brake pedal 10, linked to a master cylinder 11 to provide a brake pressure input to a servo 12. Servo 12 increases the brake pressure and supplies the increased pressure to load sensing valve 13. Valve 13 throttles the brake fluid, and controls its passage to brake actuator cylinder 14. When fluid is supplied to the actuator cylinder 14, brake shoes 15 expand to contact brake drum 16 and slow the vehicle. While an expanding shoe drum brake has been shown schematically in the Figure, it will be understood that any brake mechanism operated by fluid pressure may be used. Likewise it is to be understood that the fluid pressure may be transmitted by hydraulic fluid or other liquid, or by a compressed gas such as air.

Figure 2B:
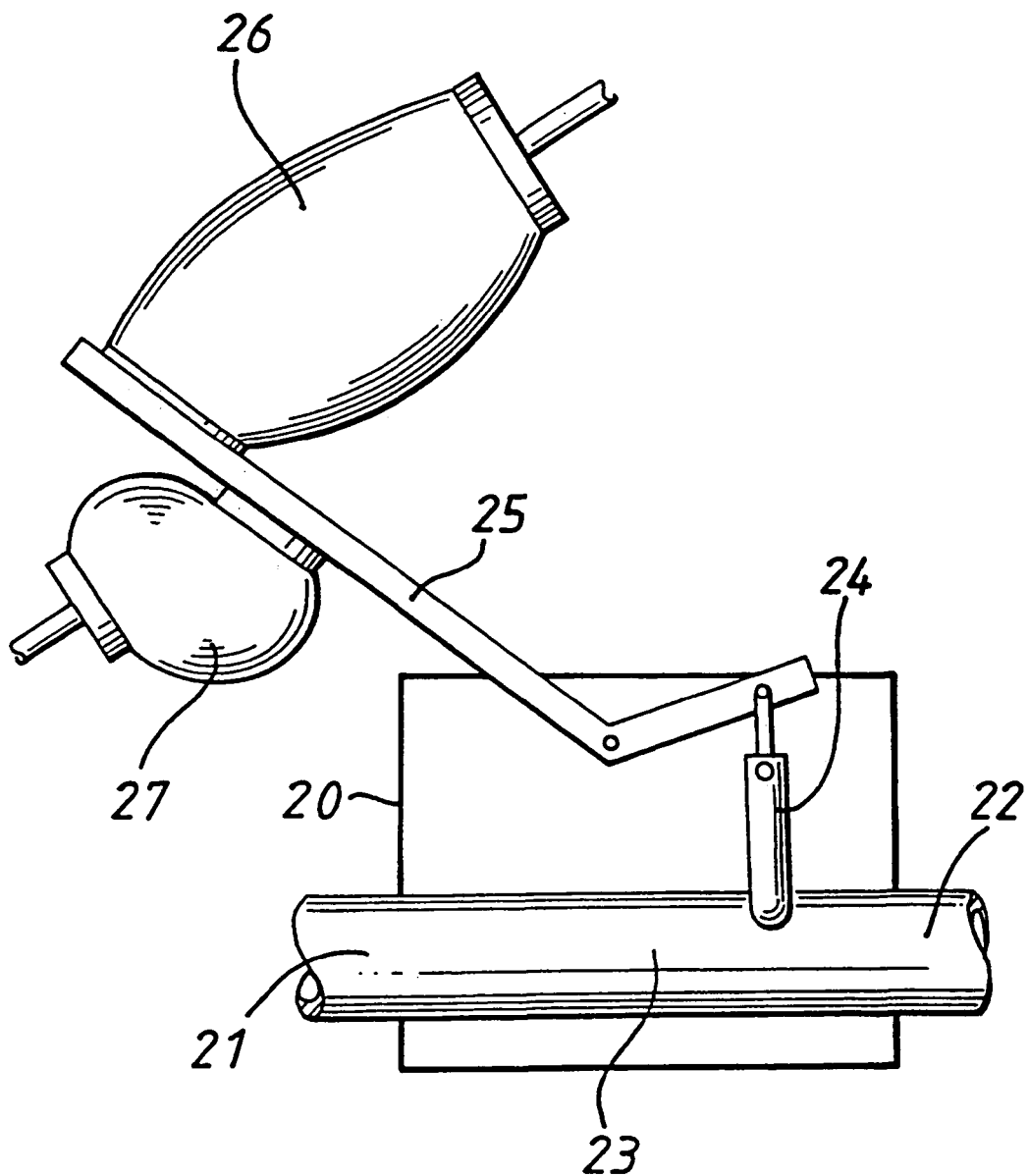

The load sensing valve is shown schematically in FIGS. 2A and 2B, and comprises a valve body 20 having an inlet 21 and an outlet 22 for brake fluid. An internal passage 23 in the body 20 connects the inlet 21 to the outlet 22, and includes a throttling element 24 controlled by a swinging arm 25. The position of the swinging arm 25 determines the amount of throttling or flow restriction in the passage 23 by advancing or retracting throttling element 24 into or from the passage 23.

Two actuators 26 and 27 exert forces on the swinging arm 25. Actuator 26 is a fluid actuator, in this case an air bag similar to the air bags 4 but on a reduced scale, and is in fluid communication via a duct 28 with the air bags 4 of the suspension system. Fluid pressure within the actuator 26 is the same as the fluid pressure in the air bags 4, and is thus dependent on the gross vehicle weight. The force exerted by the actuator 26 on the swinging arm 25 is in the sense of retracting the throttling element 24 from the passage 23, i.e. decreasing the throttling effect of throttling element 24.

A second actuator 27 acts on the swinging arm 25, in the opposite sense to the actuator 26. Fluid pressure is supplied to the second actuator 27 from the reservoir 2, via a pressure regulator 29 (seen in FIG. 1). The pressure within the actuator remains constant, but it is a feature of the air bag type of actuator that its "spring rate" increases as its volume decreases.

In operation, the load sensing valve is in the position shown in FIG. 2A when the vehicle is lightly loaded. An increase in vehicle weight causes the vehicle body to drop, and the ride height sensor 3 operates to provide compressed air to the air bags 4 to lift the body back to its datum position. The pressure within the air bags 4 is thus increased, and this increased pressure is transmitted via duct 28 to the actuator 26, increasing its force. The increased force of actuator 26 overcomes the resistance of actuator 27, and swinging arm 25 moves to a new position (FIG. 2B) in which the throttling element 24 is retracted from the passage 23 to reduce the throttling effect of the load sensing valve. The actuator 27, although supplied with fluid at a constant reference pressure, provides a progressively increasing resistance force as the actuator 27 is compressed.

Similarly, as the vehicle weight is reduced, the ride height sensor 3 causes a pressure drop in the suspension air bags 4, and thus also in actuator 26 allowing actuator 27 to move the swinging arm 25 clockwise as seen in FIGS. 2A and 2B to increase the throttling effect of the load sensing valve.

The second actuator is a fluid actuator in the embodiment shown, but in alternative embodiments may be a resilient element such as a tension or compression spring, or a torsion spring operating on the swinging arm pivot. The spring may have a constant or a variable rate, i.e. the spring force may vary linearly or non-linearly as the position of the swinging arm changes.

Figure 3:
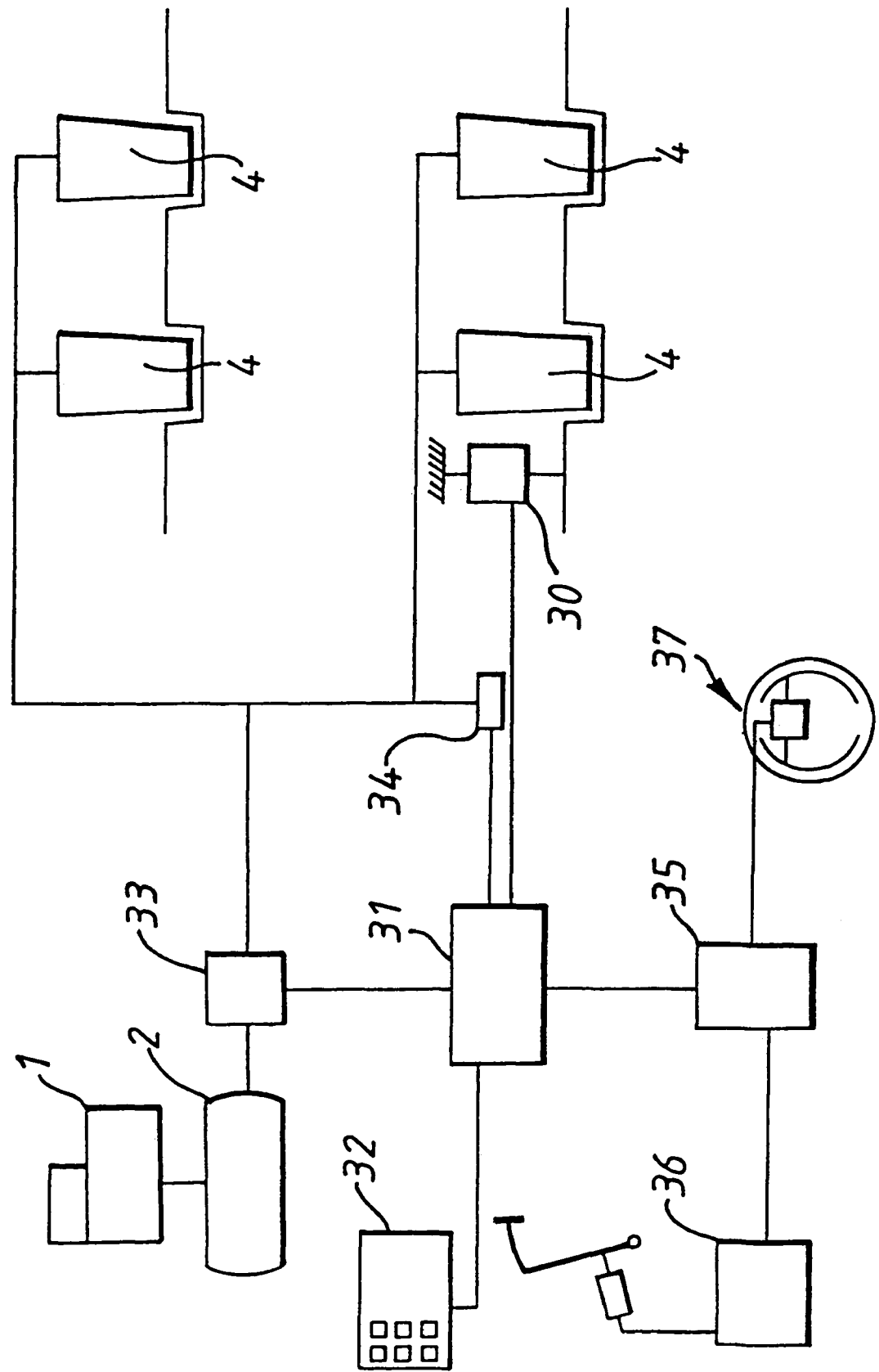
FIG. 3 is a schematic diagram showing an alternative load sensing arrangement using electrical sensors.

In the embodiment shown in FIG. 3, the fluid communication via duct 28 between the braking and suspension systems is replaced by an electronic control In FIG. 3, the suspension system again comprises a compressor 1, a reservoir 2 and air bags 4. A ride height sensor 30, which may be a variable resistor or capacitance or a position sensor cooperating with the suspension members, is arranged to produce an electrical output signal corresponding to the ride height.

An electromechanical valve 35 serves as the "load sensing valve", and is controllable by the control circuit 31 to exert a variable throttling effect on brake fluid passing from servo 36 to brake assembly 37.

Figure 4:
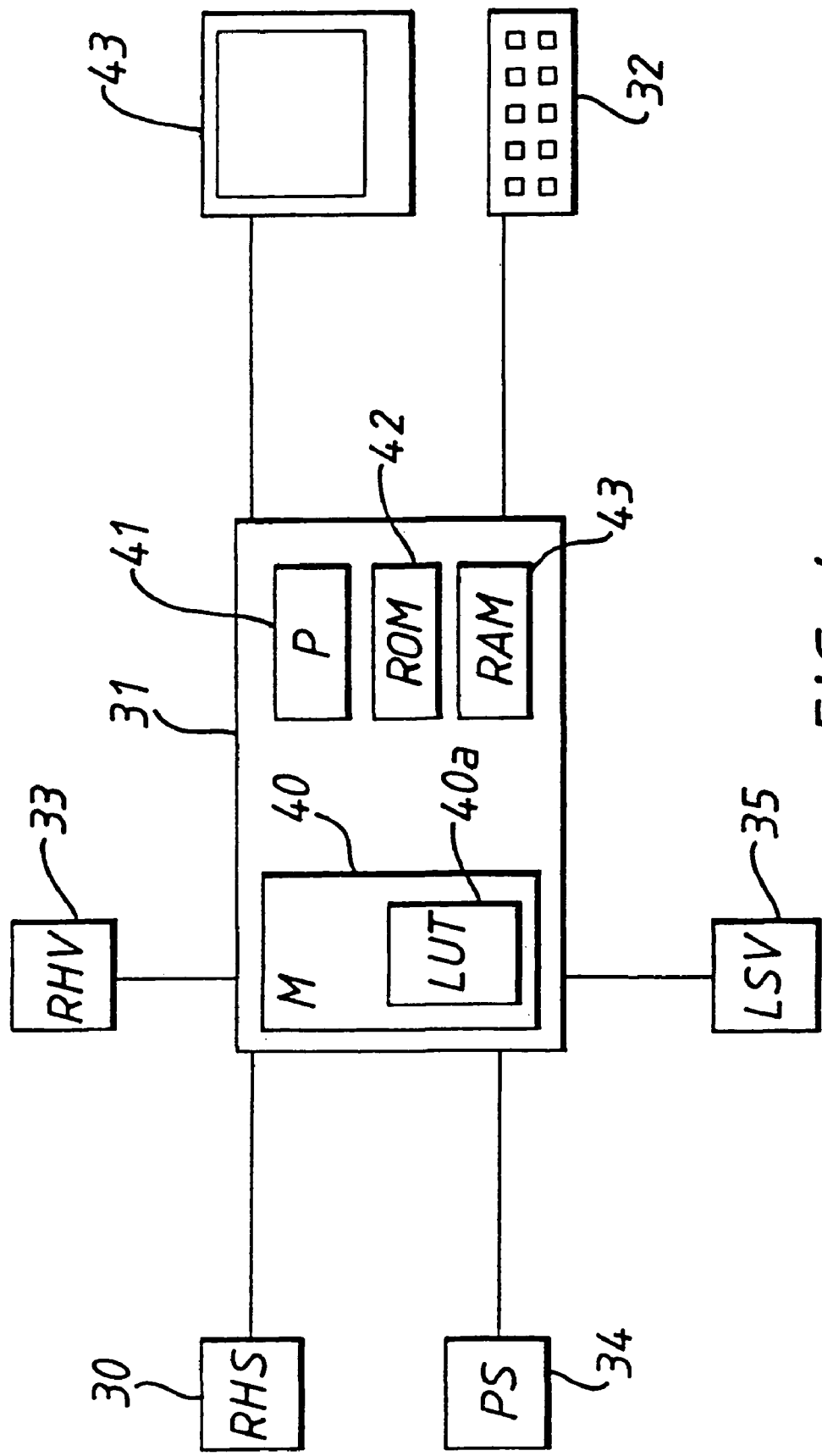
FIG. 4 is a schematic diagram of the control system of the embodiment shown in FIG. 3.

The control circuit 31 is seen in detail in FIG. 4, and comprises a memory (M) 40 for storing data, a processor (P) 41, ROM memory 42 for storing operation programs, and RAM 43 providing working memory for the processor 41;

Sensor inputs from the ride height sensor (RHS) 30 and the pressure transducer 34 (or pressure sensor (PS)) are provided to control circuit 31, as an inputs from the input device 32. A display 43 may be provided to display parameters such as desired ride height. The control circuit provides control signals to a ride height value (RHV) 33, and to an electromechanical valve 35; and The output signal from ride height sensor 30 is fed to the control circuit 31, which compares the sensed ride height value with a desired ride height value stored in memory 40. The desired ride height value may be selected by the driver using an input device such as a keyboard 32. On the basis of the comparison, control circuit 31 provides a control signal to the ride height valve 33 either to admit air to the air bags 4, or vent air therefrom, to bring the sensed ride height to the desired ride height.

A pressure transducer 34 then senses the pressure in the air bags 4, and provides an output signal to the control circuit 31 corresponding to the sensed pressure. This output is also indicative of the vehicle weight when the vehicle is at the desired ride height, since the ride height adjustment raises or lowers the pressure in accordance with the vehicle weight.

On the basis of the sensed pressure, control circuit 31 provides control signals to an electromechanical valve 35 in the braking circuit to vary its throttling effect. The valve 35 acts in the same way as the load sensing valve 13 of the embodiment shown in FIG. 1. The control circuit may include a look-up table 40a in memory 40 correlating values of sensed air bag pressure at the desired ride height with required positions for the throttle valve.

In an alternative embodiment, a conventional load sensing valve may be used, with an electromechanical actuator, such as a linear motor or a stepper motor and gearing, controlled by the control circuit 31 to position the swinging arm of the load sensing valve at the appropriate position for the sensed vehicle weight. Such an arrangement is contemplated for retrofitting air suspension to light commercial vehicles originally equipped with spring suspension.

The memory 40 of control circuit 31 may be provided with a look-up table (LUT) 40a correlating a range of values of ride height and suspension air bag pressure with gross vehicle weight, so that for any combination of sensed values of pressure and ride height, the gross vehicle weight can be immediately read out from the table. Valve 35 can then be controlled on the basis of this gross weight value, without having to wait for the ride height control to inflate or deflate the air suspension to reach the desired ride height value for sensing the air bag pressure and thereby obtaining the gross weight. The look-up table 40a may be generated in a calibration process wherein the ride height is varied at different gross weights, and correlating pairs of sensor outputs from the ride height and air pressure sensors are noted for each loading state.

The display 43 may be provided with data to display the instantaneous vehicle weight and actual ride height, and input device 32 may be used by the driver to raise or lower the ride height for loading and unloading, for example to match the vehicle height to a loading dock or kerb. For example, the control circuit 31 may include circuitry enabling the driver to increase or decrease the ride height incrementally, for example in 10 mm steps, to match a loading dock height and the vehicle load bed height.

Figure 5:
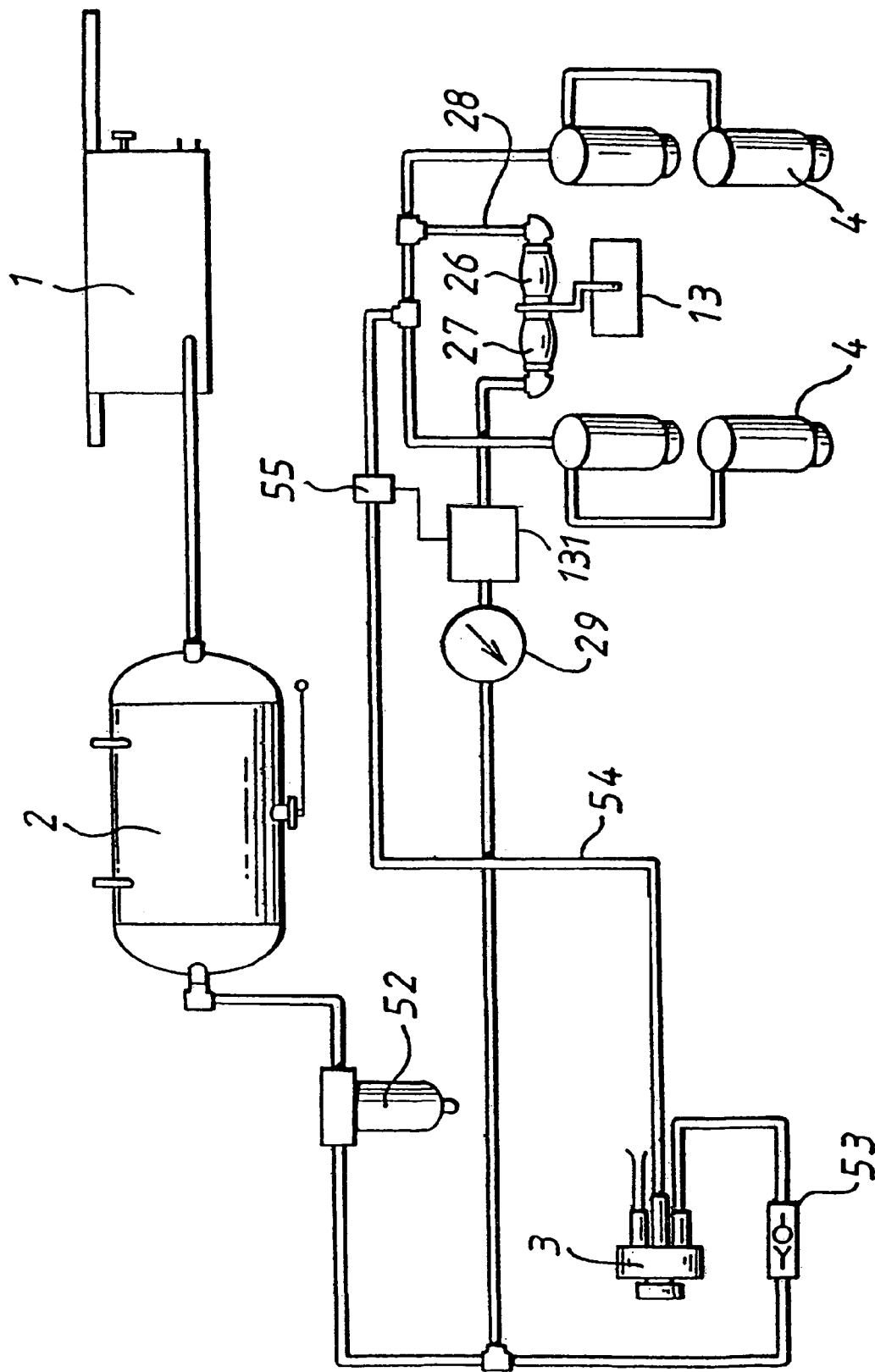
FIG. 5 is a schematic diagram similar to FIG. 1 illustrating a further alternative embodiment of the braking control system.

FIG. 5 shows an alternative embodiment of the suspension and braking control system. In this Figure components corresponding to components in FIG. 1 have been assigned the same reference numerals. In FIG. 5, the compressor 1 supplies air to the air reservoir 2, which supplies air via a water separator 52 and a non-return valve 53 to the ride height sensor 3. Air is supplied to the suspension air suspension airbags 4 via a line 54, in which a pressure switch 55 is installed to sense the air suspension pressure.

The pressure switch 55 is operatively connected to pressure regulator 29, which controls the air pressure in the second actuator 27. Pressure regulator 29 is capable of supplying air to the second actuator 27 at at least two controlled pressures, the reference pressure output by regulator being selected (e.g., using control element 131 associated with pressure regulator 29) in accordance with the air pressure sensed by the pressure switch 55.

In a first control arrangement, the pressure switch 55 is configured as a threshold detector, and gives a first output when the sensed pressure is below a predetermined threshold, and a second output when the sensed pressure is above that threshold. The pressure regulator 29 is arranged to provide first and second reference pressures, and is operatively connected to the threshold detector 55 so that when the sensed pressure in the air suspension is below the threshold, the pressure regulator 29 provides a lower reference pressure to the second actuator 27. When the sensed pressure in the suspension is above the threshold, the presssure regaulator 29 provides a higher reference pressure to the second actuator 27. In a typical arrangement in which the axle load of the vehicle varies from 700 kg to 3200 kg, the pressure in the suspension airbags may vary from 3.4 to 7.5 bar (50 to 110 psi) and the pressure supplied to the second actuator 27 may be 1.5 bar (22 psi) when the air suspension pressure is at or below 5.8 bar (85 psi), and 1.9 bar (28 psi) when the air suspension pressure is above 5.8 bar.

In a second, alternative control arrangement the pressure switch 55 may be configured with a number of thresholds, dividing the range of pressure variation in the suspension airbags into a plurality of sub-ranges. The pressure regulator 29 may then be configured to provide a plurality of different reference pressures, each corresponding to one of the sub-ranges. In the typical example referred to above, the pressure switch 55 and pressure regulator 29 may be configured to deliver a first reference pressure of 1.5 bar (22 psi) when the suspension pressure is from 3.4 to 3.8 bar (50 to 55 psi), a second reference pressure of about 1.58 bar (23 psi) when the suspension pressure is from 3.8 to 4.1 bar (55 to 60 psi), a third reference pressure of about 1.65 bar (24 psi) when the suspension pressure is from 4.1 to 4.47 bar (60 to 65 psi), a fourth reference pressure of about 1.72 bar (25 psi) when the suspension pressure is from 4.47 to 4.8 bar (65 to 70 psi), a fifth reference pressure of about 1.79 bar (26 psi) when the suspension pressure if from 4.8 to 5.1 bar (70 to 75 psi), a sixth reference pressure of about 1.86 bar (27 psi) when the suspension pressure is from 5.1 to 5.5 bar (75 to 80 psi), and a seventh reference pressure of about 1.9 bar (28 psi) when the suspension pressure is above 5.5 bar (80 psi).

As an alternative to a single pressure regulator 29 which can supply a plurality of different reference pressures, each of the reference pressures may be provided by a separate pressure regulator 29, with the pressure sensor 55 controlling a selector valve arrangement to connect the appropriate pressure regulator 29 to the second actuator 27.

In a third alternative control arrangement, the pressure regulator 29 may be adapted to provide a continuously variable reference pressure to the second actuator 27, and may be controlled by the pressure sensor 55 to increase the reference pressure in the second actuator from about 1.5 bar (22 psi) to about 1.9 bar (28 psi) as the sensed pressure in the suspension airbags increases of from about 3.4 top about 5.5 bar (50 to 80 psi).

What is claimed is:

1. A load sensing and braking system for a vehicle having a vehicle body suspended on one or more axles by a pressurized gas suspension unit whose gas pressure is varied in dependence on the vehicle load, the load sensing and braking system comprising:
   a variable throttling valve having a valve member movable between a minimum and a maximum throttling position to control the flow of a brake operating fluid to a brake actuator of the one or more axles for applying braking force to at least one wheel of the vehicle;
   a pressure sensor for detecting the gas pressure in the suspension unit;
   a first air bag responsive to the gas pressure in the suspension unit and operable to urge the valve member towards the minimum throttling position;
   a pressure regulator for supplying a reference fluid pressure at one of a plurality of predetermined reference fluid pressures;
   control means operable to select one of said plurality of predetermined reference fluid pressures on the basis of the sensed gas pressure in the suspension unit; and
   a second air bag responsive to said selected one of said plurality of reference fluid pressures and operable to urge the valve member towards the maximum throttling position.

2. The load sensing and braking system according to claim 1, wherein the pressure sensor provides a first output when the sensed gas pressure is below a predetermined threshold and a second output when the sensed gas pressure is above the predetermined threshold, and the control means is operable to select a first reference fluid pressure, from among the plurality of predetermined reference fluid pressures, that is provided to the second air bag when the pressure sensor provides the first output and to select a second reference fluid pressure, from among the plurality of predetermined reference fluid pressures, that is provided to the second air bag when the pressure sensor provides the second output.

3. A vehicle including a load sensing and braking system according to claim 2.

4. A vehicle including a load sensing and braking system according to claim 1.

5. A load sensing and braking system for a vehicle having a vehicle body suspended on one or more axles by a pressurized gas suspension unit whose gas pressure is varied in dependence on the vehicle load, the load sensing and braking system comprising:
   a variable throttling valve having a valve member movable between a minimum and a maximum throttling position to control the flow of a brake operating fluid to a brake actuator of the one or more axles for applying braking force to at least one wheel of the vehicle;
   a pressure sensor for detecting the gas pressure in the suspension unit;
   a first air bag responsive to the gas pressure in the suspension unit and operable to urge the valve member towards the minimum throttling position;

a pressure regulator for supplying a reference fluid pressure at one of a plurality of predetermined reference fluid pressures;

control means operable to select one of said plurality of predetermined reference fluid pressures on the basis of the sensed gas pressure in the suspension unit; and a second air bag responsive to said selected one of said plurality of reference fluid pressures and operable to urge the valve member towards the maximum throttling position;

wherein a restoring force of the second air bag increases as the valve member approaches the minimum throttling position.

6. A vehicle including a load sensing and braking system according to claim 5.

7. A load sensing and braking system for a vehicle having a vehicle body suspended on one or more axles by a pressurized gas suspension unit whose gas pressure is varied in dependence on the vehicle load, the load sensing and braking system comprising:

a variable throttling valve having a valve member movable between a minimum and a maximum throttling position to control the flow of a brake operating fluid to a brake actuator of the one or more axles for applying braking force to at least one wheel of the vehicle;

a pressure sensor for detecting the gas pressure in the suspension unit;

a first air bag responsive to the gas pressure in the suspension unit and operable to urge the valve member towards the minimum throttling position;

a pressure regulator for supplying a reference fluid pressure at one of a plurality of predetermined reference fluid pressures;

control means operable to select one of said plurality of predetermined reference fluid pressures on the basis of the sensed gas pressure in the suspension unit; and a second air bag responsive to said selected one of said plurality of reference fluid pressures and operable to urge the valve member towards the maximum throttling position;

wherein the pressure regulator is operable to supply first and second reference pressures, and the pressure sensor provides a first output when the sensed gas pressure is below a predetermined threshold and a second output when the sensed gas pressure is above the predetermined threshold, and the control means is operable to select a first reference fluid pressure, from among the plurality of predetermined reference fluid pressures, that is provided to the second air bag when the pressure sensor provides the first output and to provide the select a second reference fluid pressure, from among the plurality of predetermined reference fluid pressures, that is provided to the second air bag when the pressure sensor provides the second output; and wherein a restoring force of the second air bag increases as the valve member approaches the minimum throttling position.

\* \* \* \* \*